US007485595B2

(12) United States Patent
Long et al.

(10) Patent No.: US 7,485,595 B2
(45) Date of Patent: Feb. 3, 2009

(54) MOLECULAR SIEVE-CONTAINING CATALYST FOR CRACKING HYDROCARBONS AND A METHOD FOR PREPARING THE SAME

(75) Inventors: Jun Long, Beijing (CN); Yuxia Zhu, Beijing (CN); Huiping Tian, Beijing (CN); Yujian Liu, Beijing (CN); Zhenyu Chen, Beijing (CN); Yaoqing Guo, Beijing (CN); Zhijian Da, Beijing (CN); Jiushun Zhang, Beijing (CN); Mingyuan He, Beijing (CN)

(73) Assignees: China Petroleum & Chemical Corporation, Beijing (CN); Research Institute of Petroleum Processing, Sinopec, Beijing (CN)

( * ) Notice: Subject to any disclaimer, the term of this patent is extended or adjusted under 35 U.S.C. 154(b) by 500 days.

(21) Appl. No.: 10/855,386

(22) Filed: May 28, 2004

(65) Prior Publication Data
US 2004/0266608 A1 Dec. 30, 2004

(30) Foreign Application Priority Data
May 30, 2003 (CN) .............................. 03 1 37906

(51) Int. Cl.
*B01J 29/04* (2006.01)
*B01J 29/87* (2006.01)
*B01J 29/06* (2006.01)
*B01J 21/00* (2006.01)
*B01J 29/00* (2006.01)
*B01J 29/08* (2006.01)
*B01J 21/16* (2006.01)
*B01J 23/00* (2006.01)
*B01J 23/32* (2006.01)
*B01J 23/02* (2006.01)
*B01J 23/06* (2006.01)
*B01J 23/70* (2006.01)

(52) U.S. Cl. .............................. 502/60; 502/64; 502/65; 502/66; 502/73; 502/74; 502/79; 502/80; 502/305; 502/340; 502/355

(58) Field of Classification Search .................. 502/60, 502/64–68, 73, 74, 79, 80, 305–324, 340–355
See application file for complete search history.

(56) References Cited

U.S. PATENT DOCUMENTS

| 3,397,137 | A | * | 8/1968 | Picker et al. ................. 208/138 |
| 3,533,936 | A | * | 10/1970 | Weisz .......................... 208/56 |
| 3,944,482 | A | * | 3/1976 | Mitchell et al. ........ 208/120.01 |
| 4,465,779 | A | * | 8/1984 | Occelli et al. ................. 502/63 |
| 4,496,785 | A | * | 1/1985 | Miller et al. ................. 585/640 |
| 4,568,655 | A | * | 2/1986 | Oleck et al. .................... 502/66 |
| 5,051,164 | A | * | 9/1991 | Herbst et al. ........... 208/120.15 |
| 5,254,789 | A | * | 10/1993 | Gajda .......................... 585/671 |
| 5,376,608 | A | | 12/1994 | Wormsbercher et al. |
| 5,547,564 | A | * | 8/1996 | Cheng et al. ................. 208/122 |
| 5,658,454 | A | * | 8/1997 | Absil et al. ............... 208/120.1 |
| 6,036,847 | A | | 3/2000 | Ziebarth et al. |
| 6,497,811 | B1 | | 12/2002 | Myrstad et al. |
| 6,635,168 | B2 | | 10/2003 | Zhao et al. |
| 2002/0179498 | A1 | | 12/2002 | Chester et al. |
| 2003/0089639 | A1 | | 5/2003 | Chester et al. |
| 2004/0004023 | A1 | | 1/2004 | Sughrue et al. |

FOREIGN PATENT DOCUMENTS

| CA | 2444461 | 10/2002 |
| CN | 1261618 | 8/2000 |
| CN | 1281887 | 1/2001 |
| CN | 1286291 | 3/2001 |
| CN | 1341697 | 3/2002 |
| CN | 1350051 | 5/2002 |
| CN | 1382199 | 11/2002 |
| CN | 1388213 | 1/2003 |
| CN | 1388220 | 1/2003 |
| CN | 1402771 | 3/2003 |
| EP | 0798362 | 10/1997 |
| GB | 2341191 | 3/2000 |
| JP | 2003-27065 | 1/2003 |
| JP | 2003-27067 | 1/2003 |
| WO | 99/49001 | 9/1999 |

(Continued)

OTHER PUBLICATIONS

"Effects of vanadium oxidation number on disulfurization performance of FCC catalyst," Jun Long et al. Applied Catalysis A: General 282 (2005), pp. 295-301.*

(Continued)

*Primary Examiner*—Jerry Lorengo
*Assistant Examiner*—Patricia L Hailey
(74) *Attorney, Agent, or Firm*—Birch, Stewart, Kolasch & Birch LLP

(57) ABSTRACT

A molecular sieve-containing catalyst for cracking hydrocarbons, comprising molecular sieve, refractory inorganic oxide, clay and a metal component, wherein the amount of said molecular sieve is from 1 to 90% by weight, the refractory inorganic oxide is from 2 to 80% by weight, the clay is from 2 to 80% by weight, and the metal component is from 0.1 to 30% by weight, calculated as the oxide of said metal having its maximum valence state, based on the total amount of the catalyst, wherein said metal component exists essentially in a reduction state and is one or more metals selected from the group consisting of metals of Group IIIA (other than aluminum), and metals of Group IVA, VA, IB, IIB, VB, VIB and VIIB, and non-noble metals of Group VIII of the periodic table. The catalyst has higher cracking activity and higher sulfur reduction activity.

23 Claims, No Drawings

FOREIGN PATENT DOCUMENTS

| | | |
|---|---|---|
| WO | 01/21732 | 3/2001 |
| WO | 01/21733 | 3/2001 |
| WO | 02/08360 | 1/2002 |
| WO | 02/083300 | 10/2002 |
| WO | 03/006578 | 1/2003 |

OTHER PUBLICATIONS

English Language Abstract of CN 1261618.
English Language Abstract of CN 1281887.
English Language Abstract of CN 1286291.
English Language Abstract of CN 1341697.
English Language Abstract of CN 1350051.
English Language Abstract of CN 1382199.
English Language Abstract of CN 1388213.
English Language Abstract of CN 1388220.
English Language Abstract of CN 1402771.
English Language Abstract of JP 2003-27065.
English Language Abstract of JP 2003-27067.

* cited by examiner

US 7,485,595 B2

MOLECULAR SIEVE-CONTAINING CATALYST FOR CRACKING HYDROCARBONS AND A METHOD FOR PREPARING THE SAME

TECHNIQUE FIELD

The present invention relates to a catalyst for cracking hydrocarbons and a method for preparing the same, more particularly, to a molecular sieve-containing catalyst for cracking hydrocarbons and a method for preparing the same

TECHNIQUE BACKGROUND

In recent years, requirement for fuel oil standards becomes increasingly stricter due to the consideration of environmental protection worldwide. For instance in China, "Controlling Criterion of Hazardous impurities for Car Gasoline" has been drown up by National Quality Monitoring Bureau in 1999. According to the requirement of this Criterion, the sulfur content of gasoline as a finished product must be less than 800 ppm. In fact, more than 90% of sulfur in finished gasoline comes from FCC gasoline. On the other hand, the tendency that catalytic cracking feedstock grows heavier is becoming increasingly acute, and the proportion of middle-east crude oils refined by refineries in China is increasingly high, which have higher sulfur content. Therefore, there is a desire to develop a cracking catalyst with higher cracking activity and higher sulfur reduction activity.

U.S. Pat. No. 6,036,847 and its family patent EP 0,798,362 A2 disclose a process for fluidized catalytic cracking a hydrocarbon feedstock, wherein said hydrocarbon feedstock is cracked in a cracking zone in absence of added hydrogen, and all particles including catalyst particles are repeatedly circulated between a hydrocarbon cracking zone and a catalyst regeneration zone, wherein said all particles contain additional particles having less activity for catalyzing the cracking of hydrocarbon oils compared to said catalyst particles, said activity being on a fresh particle basis. The additional particles consist essentially of titania and inorganic oxide other than titania. Said inorganic oxide other than titania contains Lewis acid selected from the group consisting of elements and compounds of nickel, copper, zinc, silver, cadmium, indium, tin, mercury, thallium, lead, bismuth, boron, aluminum (other than alumina) and germanium supported on alumina. The sulfur content of FCC gasoline in cracked products is decreased by using this type of additive containing titanium oxide.

U.S. Pat. No. 5,376,608 discloses a cracking catalyst composition having a function of desulfurization, which comprises (a) a zeolite/molecular sieve dispersed in an inorganic oxide matrix; (b) a Lewis acid-containing alumina component which comprise from 1 to 50% by weight of Lewis acid selected from the group consisting of elements and compounds of nickel, copper, zinc, silver, cadmium, indium, tin, mercury, thallium, lead, bismuth, boron, aluminum (other than alumina) and germanium supported on alumina.

WO 99/49001A1 discloses a composition for reducing the sulfur content of hydrocarbon components, wherein said composition contains a hydrotalcite material which has been impregnated with a Lewis acid and optionally a FCC catalyst. Said Lewis acid comprises transition metal elements, especially zinc, copper, nickel, cobalt, iron or manganese, and their compounds.

WO 01/21733A1 discloses a catalytic cracking process for cracking a hydrocarbon feedstock containing organo-sulfur compounds in the presence of hot regenerated cracking catalyst. Said catalyst contains a product sulfur reduction component containing a metal component in an oxidation state greater than zero. Said metal component includes compounds or complexes of metal elements selected from the group consisting of Period 3, Groups VB, VIIB, VIII, IIB and IVA of the periodic table, such as metal compounds or complexes of vanadium, zinc, iron, cobalt, manganese and gallium. Said product sulfur reduction component comprises a molecular sieve of which the porous structure contains aforementioned metal component, also comprises aforementioned metal component dispersed anywhere on the catalyst carrier structure, e.g. a porous oxide carrier.

WO 01/21732A1 discloses a process for reducing the sulfur content of a cracked petroleum fraction, comprising catalytically cracking a petroleum feed fraction at elevated temperature in the presence of cracking catalyst and a product sulfur reduction additive to obtain liquid cracking products of reduced sulfur content, wherein said product sulfur reduction additive comprises a non-molecular sieve carrier containing vanadium; said non-molecular sieve carrier may be an organic or inorganic carrier; preferred the carrier is amorphous or paracrystal inorganic oxides, such as alumina, silica, clay or their mixture.

CN 1281887A discloses a process for reducing the sulfur content of catalytically cracked petroleum fractions, comprising catalytically cracking a petroleum feed fraction at elevated temperature in the presence of a product sulfur. reduction catalyst to produce liquid cracked products of reduced sulfur content. The product sulfur reduction catalyst contains a porous molecular sieve having a metal component which is within the interior pore structure. Said porous molecular sieve may be a large pore size zeolite, i. e. the zeolite having a pore structure with a ring pore opening of at least 0.7 nm such as, Y-zeolite, rare-earth Y-zeolite (REY), ultra-stable Y-zeolite (USY), L-zeolite, beta-zeolite, mordenite, ZSM-18 zeolite. Said molecular sieves may also be a intermediate pore size zeolite, i. e. the zeolite having a pore structure with a ring pore opening of larger than 0.56 nm but smaller than 0.7 nm such as Pentasil zeolite, ZSM-5 zeolite, ZSM-22, ZSM-23 zeolite, ZSM-35 zeolite, ZSM-50 zeolite, ZSM-57 zeolite, MCM-22 zeolite, MCM-49 zeolite, MCM-56 zeolite. Said molecular sieves may further be non-zeolite molecular sieves such as silicates of varying silica-alumina ratios (e.g. metallosilicates, titanosilicates), metalloaluminates (e.g. germaniumaluminates), metallophosphates, aluminophosphates, metalloaluminophosphates, metal integrated silicoaluminophosphates (MeAPSO and ELAPSO), silicoaluminophosphates (SAPO), gallogermanates and combinations of these.

CN 1261618A discloses a process for reducing the sulfur content of a catalytically cracked petroleum fraction, comprising catalytically cracking a petroleum feed fraction containing organo-sulfur compounds at elevated temperature in the presence of a cracking catalyst and a product sulfur reduction catalyst to produce liquid cracked products of reduced sulfur content. Said product sulfur reduction catalyst contains a porous molecular sieve containing a first metal component and a second metal component. Said first metal component is within the interior pore structure of the molecular sieve and exists in an oxidation state greater than zero. The second metal component comprises at least a rare-earth element and is within the interior pore structure of the molecular sieve. Said first metal component is a metal selected from the group consisting of elements of Period 4 and Groups IIB, VB, IIIA and VIII of the periodic table, especially vanadium, zinc, iron, gallium.

Since aforesaid catalysts are subjected to drying, calcining and/or hydrothermal treating without reduction process during the preparation of them, the metal component contained in aforesaid catalysts exists all in respective maximum oxidation states.

CN 1382199A discloses an adsorbent composition, consisting of a bimetal promoter and a granular carrier, said bimetal promoter exists essentially in a reduction state in an amount enough to remove sulfur from cracked gasoline under desulfurization conditions. Said bimetal promoter is any two or more selected from the group consisting of cobalt, nickel, iron, manganese, copper, zinc, molybdenum, tungsten, silver, tin, antimony and vanadium. Said carrier consists of zinc oxide in combination with any suitable inorganic and organic carrier. Said inorganic carrier includes silica, silica gel, alumina, clay, aluminum silicate, silica-alumina, titanium oxide, zirconia, zinc aluminate, zinc titanate, zinc silicate, calcium aluminate, calcium silicate, magnesium silicate, magnesium aluminate, magnesium titanate, synthetic zeolites and/or natural zeolites. The composition is used as an adsorbent for removing sulfur from cracked gasoline and diesel fuel, not as a cracking catalyst.

CA2444461 discloses an equilibrium cracking catalyst and a method for reducing sulfur content of gasoline fraction during the process of catalytically cracking. Said equilibrium cracking catalyst comprises at least one Y-type zeolite and Lewis acid addictive, wherein said lewis acid is a metal selected from the group consisting of Ni, Cu, Zn, Ag, Cd, In, Sn, Hg, Tl, Pb, Bi, B, Al, Mg, Mn, Ga or the combination thereof, and said metal is in zero valence state or is an oxide. The Lewis acid addictive is obtained by drying the alumina impregnated with the Lewis acid at mild temperature(100 to 150° C.), and calcining at 200 to 850° C. to remove the anionic portions of the Lewis acid salt. Although it is mentioned in the application that the metal can be in zero valence state, it is not suggested how to obtain a catalyst containing metals in zero valence state from the process.

An object of the present invention is to provide a novel molecular sieve-containing catalyst for cracking hydrocarbons, having higher cracking activity and higher sulfur reduction activity.

The inventor of the present invention has discovered that, if a metal component is introduced into a cracking catalyst in reduction state, not only the sulfur reduction activity of the cracking catalyst can be increased, but also, unexpectedly, the cracking activity of the cracking catalyst can be increased significantly.

The catalyst according to the present invention comprises molecular sieve, refractory inorganic oxide, clay and a metal component. The amount of the molecular sieve is from 1 to 90% by weight, the refractory inorganic oxide is from 2-80% by weight, the clay is from 2 to 80% by weight, and the metal component is from 0.1 to 30% by weight calculated as the oxide of said metal having its maximum valence state, based on the total amount of the catalyst. Said metal component exists essentially in a reduction state and is one or more metals selected from the group consisting of metals of Group IIIA (other than aluminium), and metals of Groups IVA, VA, IB, IIB, VB, VIB, VIIB, and non-noble metals of Group VIII of the periodic table.

The process for preparing the catalyst according to the present invention comprises contacting the composition comprising metal-containing component compound, molecular sieve, refractory inorganic oxide and clay with a reducing gas-containing atmosphere at enough temperature for enough time so that the metal component has an average valence state less than its maximum oxidation state. Said metal component is one or more metals selected from the group consisting of metals of Group IIIA (other than aluminum), and metals of Groups IVA, VA, IB, IIB, VB, VIB and VIIB, and non-noble metals of Group VIII of the periodic table. The amount of each component is such that the final catalyst comprises, based on the total amount of the catalyst, from 1 to 90% by weight of the molecular sieve, from 2 to 80% by weight of the refractory inorganic oxide, from 2 to 80% by weight of the clay, and from 0.1 to 30% by weight of the metal component, calculated as the oxide of said metal having its maximum valence state.

Compared with the catalyst of the prior art, the catalyst according to the present invention has higher sulfur reduction activity, and further, unexpectedly, higher cracking activity. For example, by using the catalyst of the present invention, which contains 30 wt % of MOY-zeolite, 34 wt % of alumina, 35 wt % of kaolin, 1 wt % of cobalt, calculated as $Co_2O_3$, in which cobalt has +1.5 of an average valence state (thereby the ratio value of the average valence state to maximum valence state of cobalt is 0.5), (after deactivated by steam-aging at 800° C. for 8 hours, then reduced), the catalytically cracking of the vacuum gas oil with a distillation range of 329-550° C. and a sulfur content of 2.0% by weight was carried out under conditions of a reaction temperature of 500° C., a WHSV of 16 $hr^{-1}$, a weight ratio of catalyst to oil of 4.0, as a result, the conversion was 78.6% by weight, the sulfur content of gasoline product was only 416.7 mg/l. However, when a cracking catalyst having the same content of zeolite but no cobalt and a catalyst having all the same contents of each component but cobalt only in its maximum valence state(+3 valence) were used to carry out the catalytic cracking reaction of the same feedstock oil at the same conditions, only 68.9 wt % and 75.1 wt % of conversions were obtained respectively, and the sulfur contents of gasoline products were up to 758.3 mg/l and 670.6 mg/l, respectively.

SPECIFIC EMBODIMENT MODES

The catalyst according to the present invention contains from 1 to 90% by weight of the said molecular sieve, from 2 to 80% by weight of the refractory inorganic oxide, from 2 to 80% by weight of the clay and from 0.1 to 30% by weight of the said metal component calculated as the oxide of the metal having its maximum valence state. Preferably, said molecular sieve is from 10 to 60% by weight, the refractory inorganic oxide is from 10 to 50% by weight and the clay is from 20 to 70% by weight, and said metal component is from 0.5 to 20% by, weight, calculated as the oxide of said metal having its maximum valence state.

Said reduction state refers to an average valence state of metal at which the state is zero valence or higher than zero valence but less than the maximum oxidation state. In the preferred case, said metal has a ratio value of its average valence state to the maximum valence state from 0 to 0.95, more preferably from 0.1 to 0.7.

The maximum valence state of said metal herein refers to that of said metal able to exist stably in metal oxide after being oxidized completely. For example, the maximum oxidation state of non-aluminum metals of Group IIIA of the periodic table is generally +3 valence (e.g. gallium); the maximum oxidation state of Group IVA metals is generally +4 valence; the maximum oxidation state of Group VA metals is generally +5 valence; the maximum oxidation state of Group IB metals is generally +2 valence (e.g. copper) or +1 valence (e.g. silver); the maximum oxidation state of Group IIB metals is generally +2 valence; the maximum oxidation state of Group VB metals is generally +5 valence; the maximum oxidation state of Group VIB metals is generally +6 valence; the maximum oxidation state of Group VIIB metals is generally +4 valence (e.g. manganese) or +7 valence (e.g. rhenium); the oxidation state of Group VIII non-noble metals is generally +3 valence (e.g. iron or cobalt) or +2 valence (e.g. nickel).

Said average valence state of metal is measured as followed:

Weighing precisely about 0.4 g of a catalyst and placing it in the sample cell of TPD/R/O analysis instrument, introducing a mixed gas of hydrogen and nitrogen, in which the amount of the hydrogen is 5% by volume, into the sample cell at a hydrogen flow rate of 20 ml/min, heating the sample cell from room temperature to 1000° C. at a speed of 10° C./min by means of a temperature programming procedure to reduce the catalyst in the cell, then measuring TPR characteristic peaks of the metal component in the catalysts reduced before and after respectively, and calculating the average valence state of the metal according to formulae:

$$\beta_M = \beta_{M'} - 2f(A_1 - A)/N$$

Wherein $\beta_M$ is an average valence state of the metal component M in the catalyst; $\beta_{M'}$ is the maximum valence state of the metal component in the catalyst; A is an area of TPR characteristic peak of metal M in the catalyst when the metal component M is in a reduction state; $A_1$ is an area of TPR characteristic peak of metal M in the catalyst when the metal component is in a maximum oxidation state; N is the content of metal component M in the catalyst (by mole); f is a correction factor and is measured as follows: weighing precisely about 6.5 mg of CuO, and placing it in the sample cell of aforementioned TPD/R/O analysis instrument; measuring the area $K_2$ of TPR characteristic peak when CuO has been completely reduced under the same conditions as those mentioned above; calculating the hydrogen consumption (by mole) $K_1$ according to the stoichiometric number of the reduction reaction; f is a ratio of the hydrogen consumption to TPR characteristic peak area, i.e. $f = K_1/K_2$ and expressed by a unit of mole/area of TPR characteristic peak.

Since TPR characteristic peak of each metal has a different position, thus even though the catalyst contains more than two metal components, TPR characteristic peak of each metal can also be measured.

Said metal component is one or more metals selected from the group consisting of metals of Group IIIA (other than aluminum), and metals of Groups IVA, VA, IB, IIB, VB, VIB and VIIB, and non-noble metals of Group VIII of the periodic table. Said metals of Group IIIA include gallium, indium and thallium. Said metals of Group IVA include germanium, tin and lead. Said metals of Group VA include antimony and bismuth. Said metals of Group IB include copper and silver. Said metals of Group IIB include zinc and cadmium. Said metals of Group VB include vanadium, niobium and tantalum. Said metals of Group VIB include chromium, molybdenum and tungsten. Said metals of Group VIIB include manganese, technetium and rhenium. Said non-noble metals of Group VIII include iron, cobalt and nickel. Said metal component is preferably one or more selected from the group consisting of gallium, germanium, tin, antimony, bismuth, lead, copper, silver, zinc, cadmium, vanadium, molybdenum, tungsten, manganese, iron, cobalt and nickel; more preferably is one or more selected from the group consisting of gallium, tin, copper, silver, zinc, vanadium, molybdenum, manganese, iron and cobalt.

Said metal component may exist simultaneously in the molecular sieve, refractory inorganic oxide and clay, or in any two of the molecular sieve, refractory inorganic oxide and clay, or even in any one of the molecular sieve, refractory inorganic oxide and clay.

In a specific embodiment according to the present invention, said metal component may exist in the refractory inorganic oxide and/or clay, especially when said metal component is vanadium, nickel and/or iron.

Said molecular sieve is one or more selected from the group consisting of zeolites and non-zeolite molecular sieves, which are used as an active component of cracking catalyst. These zeolites and molecular sieves are well known for one skilled in the art.

Said zeolite is preferably one or more selected from large pore size zeolites and intermediate pore size zeolites. Said large pore size zeolites are those having a pore structure with a ring pore opening of at least 0.7 nm, such as, one or more selected from the group consisting of faujasite, L-zeolite, beta zeolite, Ω-zeolite, mordenite, ZSM-18 zeolite, especially one or more selected from the group consisting of Y-zeolite, phosphorus- and/or rare-earth-containing Y-zeolite, ultra-stable Y-zeolite, phosphorus-and/or rare-earth-containing ultra-stable Y-zeolite, beta zeolite.

Said intermediate pore size zeolites are those having a pore structure with a ring pore opening of higher than 0.56 nm but less than 0.7 nm, such as one or more selected from the group consisting of zeolites having a MFI structure (e.g. ZSM-5 zeolite), phosphorus- and/or rare-earth-containing zeolites having a MFI structure (e.g. a phosphorus- and/or rare-earth-containing ZSM-5 zeolites, phosphorus-containing zeolites having a MFI structure as disclosed in CN 1194181A), ZSM-22 zeolite, ZSM-23 zeolite, ZSM-35 zeolite, ZSM-50 zeolite, ZSM-57 zeolite, MCM-22 zeolite, MCM-49 zeolite, MCM-56 zeolite.

Said non-zeolite molecular sieve refers to one or more molecular sieves in which part or all of aluminum and/or silicon are substituted by one or more other elements such as phosphor, titanium, gallium and germanium. Examples of these molecular sieves include one or more molecular sieves selected from silicates of varying silica-alumina ratios(e.g. metallosilicate, titanosilicate), metalloaluminates (e.g. germaniumaluminates), metallophosphates, aluminophosphates, metalloaluminophosphates, metal integrated silicoaluminophosphates (MeAPSO and ELAPSO), silicoaluminophosphates (SAPO), and gallogermanates. Especially it is one or more selected from the group consisting of SAPO-17 molecular sieve, SAPO-34 molecular sieve and SAPO-37 molecular sieve.

Preferably, said molecular sieve is one or more selected from the group consisting of Y-zeolite, phosphorus- and/or rare-earth-containing Y-zeolite, ultra-stable Y-zeolite, phosphorus- and/or rare-earth-containing ultra-stable Y-zeolite, beta zeolite, zeolites having a MFI structure, phosphorus-and/or rare-earth-containing zeolites having a MFI structure.

Said refractory inorganic oxide is one or more selected from the group consisting of refractory inorganic oxides which are used as a matrix material and a binder component in conventional cracking catalysts, such as one or more selected from the group consisting of alumina, silica, amorphous silica-alumina, zirconia, titanium oxide, boron oxide, and/or oxides of alkaline earth metals. Preferred is one or more selected from the group consisting of alumina, silica, amorphous silica-alumina, zirconia, titanium oxide, magnesium oxide, and calcium oxide. The refractory inorganic oxides are well known for one skilled in the art.

Said clay is one or more selected from the group consisting of clays used as the active component of cracking catalysts, such as one or more selected from the group consisting of kaolin, halloysite, montmorillonite, kieselguhr, endellite, soapstone, reactorite, sepiolite, attapulgus, hydrotalcite and bentonite. More preferred clay is kaolin. These clays are well known for one skilled in the art.

The catalysts according to the present invention may further contain a rare earth metal component existing in a form of metal and/or its compounds. Said rare-earth metal component may exist simultaneously in the molecular sieve, refractory inorganic oxide and clay, or in any two of the molecular sieve, refractory inorganic oxide and clay, or even in any one of the molecular sieve, refractory inorganic oxide and clay. Said rare earth metal is one or more selected from the group consisting of lanthanide- and actinide-rare earth metals, preferably one or more selected from the group consisting of lanthanum, cerium, praseodymium, neodymium, promethium, samarium, europium, gadolinium, terbium, dysprosium, holmium, erbium, thulium, ytterbium, lutetium, more preferably is lanthanum, cerium, rich-lanthanum norium or rich-cerium norium. Based on the total amount of catalyst, the amount of said rare-earth metal component is from 0 to 50% by weight, calculated as oxide, preferably from 0 to 15% by weight.

The catalyst according to the present invention may further contain phosphorus component existing in a form of phosphorous compounds, such as oxides of phosphorus and/or phosphates. Said phosphorus component may exist simultaneously in the molecular sieve, refractory inorganic oxide and clay, or in any two of the molecular sieve, refractory inorganic oxide and clay, or even in any one of the molecular sieve, refractory inorganic oxide and clay. Based on the total amount of catalyst, the amount of said phosphors component content is from 0 to 15% by weight, calculated as element phosphorus, preferably from 0 to 8% by weight.

In Examples of the present invention, if the rare-earth component and/or phosphorus component are contained in the molecular sieve which is used in the preparation of the catalyst, the amount of said molecular sieve is just that of the rare-earth component and/or phosphorus component-containing molecular sieve. The amount of phosphorus component and rare-earth component is neither separately calculated, nor given.

In the preparation process of the catalyst according to this invention, said reducing gas-containing atmosphere refers to an atmosphere of pure reducing gas or an atmosphere containing reducing gas and inert gases.

Examples of said pure reducing gas include one or more gases selected from the group consisting of hydrogen, carbon monoxide and hydrocarbons containing 1-5 carbon atoms, preferably include one or more selected from the group consisting of hydrogen, carbon monoxide, methane, ethane, propane, butane and its various isomers, pentane and their isomers.

Said inert gases refer to gases that do not react with said composition or metal compounds, such as one or more selected from the group consisting of Group 0 gases of the periodic table, nitrogen, carbon dioxide.

Examples of said atmosphere containing the reducing gas and inert gases include a mixture of one or more gases selected from the group consisting of hydrogen, carbon monoxide and hydrocarbons containing from 1 to 5 carbon atoms and one or more inert gases, or refinery dry gas.

In said reducing gas-containing atmosphere, the concentration of the reducing gas is not particularly limited, as long as the reducing gas is in an amount enough to reduce said metals. Preferably, in said reducing gas-containing atmosphere, the amount of the reducing gas is at least 10% by volume, more preferably 50% by volume.

Said contact temperature and contact time are high or long enough to decrease the ratio of the average valence state to the maximum valence state of said metal component to from 0 to 0.95, preferably from 0.1 to 0.7. In general, said contact temperature may be from 100° C. to 900° C., preferably from 400 to 700° C., said contact time may be from 0.1 second to 10 hours, preferably from 1 second to 5 hours. Said contact may be one carried out in static state, that is, said composition is contacted with a reducing gas-containing atmosphere in a closed vessel. Said contact may also be one carried out in dynamic state. Namely, said reducing gas-containing atmosphere is passed through the bed of said composition. Said contact pressure is not limited. The contact may be carried out under an atmospheric pressure, and also may be carried out under a pressure higher than or less than atmospheric pressure. Said reducing gas-containing atmosphere is used in an amount no less than 5 ml per gram of catalyst per hour, preferably no less than 10 ml per gram of catalyst per hour, more preferably 100-2000 ml per gram of catalyst per hour.

The amount of each component preferably is such that the final catalyst comprises, based on the total amount of catalyst, from 10 to 60% by weight of the molecular sieve, from 10 to 50% by weight of the refractory inorganic oxide, from 20 to 60% by weight of the clay and from 0.5 to 20% by weight of the metal component, calculated as the oxide of said metal having its maximum valence state.

Said composition containing metal component compound, molecular sieve, refractory inorganic oxide and clay may be an conventional cracking catalyst containing metal component, or may be a composition obtained by introducing metal component compound into the cracking catalyst having no metal component.

Methods for preparing said conventional cracking catalysts containing metal component are well known for one skilled in the art, which are not further described thereafter.

The method for introducing metal component compound into a cracking catalyst containing no metal component is also a conventional one. For example, said composition containing metal component compound, molecular sieve, refractory inorganic oxide and clay may be prepared by introducing metal component into the cracking catalyst containing no metal component using the following methods.

Method One (1) a). Impregnating molecular sieve, refractory inorganic oxide, precursor of the refractory inorganic oxide and/or clay with a solution containing metal component compound, then drying or not drying the resultant slurry; or b). mixing the molecular sieve, the refractory inorganic oxide, the precursor of refractory inorganic oxide and/or the clay with a solution containing said metal component compound, then drying or not drying the resultant slurry; or c). mixing physically said metal component compound with the molecular sieve, the refractory inorganic oxide, the precursor of refractory inorganic oxide and/or clay; or d). mixing the molecular sieve, the refractory inorganic oxide, the precursor of refractory inorganic oxide and/or clay with a solution of said metal component compound, adding a precipitant used for said metal component compound to the resultant mixture to precipitate said metal component onto the molecular sieve, the refractory inorganic oxide, the precursor of refractory inorganic oxide and/or the clay, then drying or not drying the resultant solid; or e). mixing the molecular sieve, the refractory inorganic oxide, the precursor of refractory inorganic oxide and/or the clay with the solution containing said metal component compound to prepare a colloid with the obtained slurry; or f). or mixing the molecular sieve, the refractory inorganic oxide, the precursor of refractory inorganic oxide and/or the clay and deionized water with the metal component compound insoluble in water to prepare a colloid with the obtained slurry, then drying or not drying the resultant colloid;

(2) slurrying said molecular sieve, the refractory inorganic oxide, the precursor of refractory inorganic oxide and/or the clay, or said mixture, or colloid, which have been introduced with metal component compound, with deionized water and the molecular sieve, the refractory inorganic oxide, the precursor of the refractory inorganic oxide and/or the clay, which contain no metal component compound, to prepare a slurry having a solid content of from 10 to 60% by weight, preferably from 20 to 50% by weight, then drying the obtained slurry, and then calcining or not calcining the dried solid.

Method Two

Slurrying molecular sieve, refractory inorganic oxide and/or the precursor of refractory inorganic oxide and clay and deionized water to prepare a slurry having a solid content of from 10 to 60% by weight, preferably from 20 to 50% by weight, then drying the obtained slurry, and then calcining or not calcining the resultant solid, then impregnating the dried solid with a solution containing said metal component compound, or mixing said solution of metal component compound with the dried solid, then drying, calcining or not calcining the resultant solid.

Method Three

Slurrying the molecular sieve, the refractory inorganic oxide and/or the precursor of refractory inorganic oxide, the clay, deionized water and said metal component compound to prepare a slurry having a solid content of from 10 to 50% by weight, preferably from 20 to 50% by weight, then drying the resultant slurry, calcining or not calcining the dried solid.

If the catalyst contains further a rare-earth metal component and/or a phosphorus component, the method abovementioned may be used alternatively or additionally to introduce the rare-earth metal component and/or phosphorus component just by using the rare-earth compound and/or phosphorous compound to replace the compound of aforementioned metal component. Said rare-earth metal component and/or phosphorus component may also be contained in the commercial molecular sieve per se (such as rare-earth- and/or phosphorus-containing Y-zeolites or ultra-stable Y-zeolites).

The methods and conditions for drying the mixture after the metal component compound has been introduced and for drying the slurry are well known for one skilled in the art. For example, the drying method may be air-drying, oven-drying, air-blown drying, spray drying. Method for drying slurry is preferably spray drying. Drying temperature may be in the range of from room temperature to 400° C., preferably from 100 to 350° C. The conditions of the calcination after the slurry is dried and the calcination after the metal compound is impregnated are well known for one skilled in the art. Generally, the calcination temperature after the slurry is dried and the calcination temperature after the metal compound is impregnated are all in the range of from 400° C. to 700° C., preferably from 450° C. to 650° C., and the calcination time are at least for 0.5 hours, preferably from 0.5 to 100 hours, more preferably from 0.5 to 10 hours.

Said precursor of refractory inorganic oxide refers to one or more selected from substances able to form said refractory inorganic oxide during the preparation of said cracking catalyst. For example, the precursor of alumina may be selected from the group consisting of hydrated alumina (e.g. pseudo-boehmite) and/or alumina-sol. The precursor of silica may be one or more selected from the group consisting of silica-sol, silica gel and water glass. The precursor of amorphous silica-alumina may be one or more selected from the group consisting of silica-alumina sol, mixtures of silica-sol and alumina sol, silica-alumina gel. The precursor of other refractory inorganic oxides may be selected from their hydroxides, e.g. hydroxides of zirconium, titanium, earth alkali metals, and boric acid.

Said metal component compound may be water-soluble metal compounds, also may be water-insoluble or non-soluble metal compounds such as one or more nitrates, chlorides, hydroxides, oxides of metals selected from the group consisting of metals of Group IIIA (other than aluminum), metals of Group IV, VA, IB, IIB, VB, VIB and VIIB, and non-noble metals of Group VIII of the periodic table. Especially one or more nitrates, chlorides, hydroxides and oxides of metals selected from the group consisting of gallium, tin, copper, silver, zinc, vanadium, molybdenum, manganese, iron, cobalt.

Said rare-earth metal compound may be water-soluble compounds of the rare-earth metal, also may be water-insoluble and/or non-soluble compounds of the rare-earth metal, such as one or more selected from the group consisting of chlorides, nitrates, hydroxides, oxides of rare-earth metal.

Said phosphorous compound may be water-soluble compounds of said phosphorous, also may be water-insoluble and/or non-soluble compounds thereof, such as one or more selected from the group consisting of phosphoric acid, phosphorous acid, ammonium phosphates, alkali-metallophosphates, oxides of phosphorus, aluminum phosphate.

The catalyst according to the present invention may be used alone as FCC catalyst, also may be used as a sulfur reduction additive in combination with various cracking catalysts. The proportion of the catalyst of the present invention in the catalyst mixture is dependent on the sulfur content of feedstock oils and the sulfur content required for gasoline products. Usually, the proportion of the catalyst according to the present invention comprises at least 0.1% by weight of the catalyst mixture, preferably at least 1% by weight, more preferably at least 3% by weight, most preferably at least 10% by weight. Furthermore, as an additive of the cracking catalyst, the catalyst according to the present invention may be further used in combination with other additives, such as, combustion improver, sulfur transforming catalyst, octane improver and the like, mixed together with various cracking catalyst.

The catalyst according to the present invention is used whether as a main catalyst, or an additive, the operation conditions are conventional reaction conditions for a cracking process of hydrocarbons, such as, a reaction temperature of from 400° C. to 700° C., preferably from 450° C. to 600° C., a WHSV of from 10 hr$^{-1}$ to 120 hr$^{-1}$, preferably from 10 hr$^{-1}$ to 80 hr$^{-1}$, a catalyst-oil weight ratio of from 1 to 20, preferably from 3 to 15. Also, these may be used in a deep catalytic cracking process or deep catalytic pyrolysis process.

The catalyst according to the present invention may be used as a main catalyst for catalytic cracking of hydrocarbon oils containing no sulfur in order to increase conversion of hydrocarbon oils. The catalyst according to the present invention may also be used as a main catalyst or additive for catalytically cracking of sulfur-containing hydrocarbon oils in order to increase the conversion of hydrocarbon oils and simultaneously reduce the sulfur of cracked products. These hydrocarbon oils may be one or more selected from the group consisting of petroleum oils and various fractions containing sulfur or no sulfur, such as, atmospheric residues, vacuum residuum, vacuum gas oils, atmospheric gas oils, straight gas oils, propane-deasphalted light/heavy oils, and coking gas oils, as well as hydrotreated atmospheric residues, vacuum residuum, vacuum gas oils, atmospheric gas oils.

Following examples are provided to illustrate further the present invention.

Unless stated otherwise, kaolin used is a product having a solid content of 76% by weight, available from Suzhou Kaolin Corporation, Jiangsu Province, China; pseudo-boehmite used is a product having a solid content of 62% by weight, available from Zibo 501 Factory, Shangdong Province, China; alumina-sol used is a product having a $Al_2O_3$ content of 21% by weight, available from ChiLu Catalyst Factory, Shangdong Province, China; silica-sol used is a product having a $SiO_2$ content of 27% by weight, available from ChiLu Catalyst Factory, Shangdong Province, China; metal component compounds used are all in chemical grade.

Zeolite in fresh cracking catalysts has a very high cracking activity. In practical industrial production, the catalyst is used circularly. After the fresh catalyst is used for a period of time, the catalyst will reach a relatively stable activity level. Thus, the true activity of the catalyst should be estimated by using a catalyst deactivated to an activity level corresponding to that an equilibrium catalyst has. This may be realized by aging hydrothermally the catalyst to deactivate the zeolite therein. In following examples of the present invention, there is a step for aging catalyst before the reduction step. The step added is for ease in evaluating the activity of catalyst without any meaning to show that the aging step is required for the process of the preparation of the catalyst provided in the present invention. In fact, the aging step is not necessary in industrial production.

EXAMPLE 1

The example is provided to illustrate the catalyst according to the present invention and a method for preparing the same.

Kaolin and pseudo-boehmite were mixed with a 30 wt % aqueous cobalt nitrate solution, added thereto deionized water and then mixed homogeneously. A 36.5 vol % hydrochloric acid was slowly added into the resultant mixture under fast stirring to adjust pH value of the slurry to 2.0, then added thereto a phosphorus- and rare-earth-containing HY-zeolite (Commercial trademark MOY, having a unit cell size of 24.59 Å, a $Na_2O$ content of 1.5% by weight, a phosphorus content of 1.2% by weight, calculated as element phosphorus, and a rare-earth oxide content of 8.5% by weight, wherein a lanthanum oxide content was 4.5% by weight, a ceria content was 1.1% by weight, and other rare-earth oxides content was 2.9% by weight, produced by Chilu Catalyst Factory, Shangdong, China), and then mixed homogeneously. Deionized water was used in such an amount that the slurry was obtained having a solid content of 25% by weight. Kaolin, pseudo-boehmite, MOY-zeolite and the aqueous solution of cobalt nitrate were used in amounts such that the weight ratio between kaolin (on the weight of dry basis), $Al_2O_3$, MOY-zeolite (on the weight of dry basis) and $Co_2O_3$ was reached to 35.0:34.0:30.0:1.0.

The obtained slurry was dried by spraying at a temperature of 150° C., then the resultant solid was calcined at 550° C. for 1 hour, and then aged at 800° C. with 100% steam for 6 hours. A fixed bed reduction reactor was filled with 200 g of the obtained catalyst, and hydrogen was passed through the reactor at a temperature of 400° C. in a flow of 1000 ml/minute to contact said solid for 0.5 hour, then the reactor was cooled to room temperature, the reduced solid was discharged to obtain catalyst C1 according to the present invention. The composition of catalyst C1 and the type, distribution, average valence state and the ratio of the average valence state to the maximum valence state of metal components are shown in Table 1. The catalyst compositions shown in table 1 are obtained by calculation, and metal component contents are calculated respectively as the oxide having its maximum oxidation state of said metal component.

EXAMPLE 2

This example is provided to illustrate the catalyst according to the present invention and a method for preparing the same.

Catalyst C2 according to the present invention was obtained by using the same method as that in Example 1 for preparing catalyst, except that the contact temperature of said solid with hydrogen was 500° C. and the contact time was 3 hours. The composition of Catalyst C2 and the type, distribution, average valence state and ratio of the average valence state to the maximum valence state of metal component are shown in Table 1.

EXAMPLE 3

This example is provided to illustrate the catalyst according to the present invention and a method for preparing the same.

A kaolin containing 2.78% by weight of $Co_2O_3$ was obtained by impregnating 3.0 kg(on the weight of dry basis) kaolin with 3.65 kg of a 10 wt % aqueous cobalt nitrate hexahydrate solution, then the impregnated kaolin was dried in an oven at 120° C., then calcined at 600° C. for 1 hour.

Catalyst C3 according to the present invention was obtained by using the same method as that in Example 1 for preparing catalyst, except that the kaolin containing 2.78 wt % of $Co_2O_3$ was used to replace said kaolin in Example 1 and no aqueous cobalt nitrate solution was added. The composition of Catalyst C3 and the type, distribution, average valence state and ratio of the average valence state to the maximum valence state of metal component are shown in Table 1.

EXAMPLE 4

This example is provided to illustrate the catalyst according to the present invention and a method for preparing the same.

A MOY-zeolite containing 3.23% by weight of $Co_2O_3$ was obtained by impregnating MOY-zeolite with a 10 wt % aqueous cobalt nitrate hexahydrate solution in a ratio by weight of solution to MOY-zeolite(on the weight of dry basis) of 1.42:1, then the impregnated MOY-zeolite being dried in an oven at 120° C., then calcined at 550° C. for 1 hour.

Kaolin, pseudo-boehmite and deionized water were mixed homogeneously. A 36.5 vol % hydrochloric acid was slowly added into the resultant mixture under fast stirring to adjust pH value of the slurry to 2.0, then added thereto the MOY-zeolite containing 3.23% by weight of $Co_2O_3$, and then mixed homogeneously. Deionized water was used in such an amount that the slurry was obtained having a solid content of 25% by weight. Kaolin, pseudo-boehmite and MOY-zeolite containing 3.23% by weight of $Co_2O_3$ were used in amounts such that the weight ratio between kaolin (on the weight of dry basis), $Al_2O_3$, MOY-zeolite (on the weight of dry basis) and $Co_2O_3$ was 35.0:34.0:30.0:1.0.

The obtained slurry was dried by spraying at a temperature of 150° C., then calcined at 550° C. for 1 hour, and then aged at 800° C. with 100% steam for 6 hours. A fixed bed reduction reactor was filled with 200 g of the obtained catalyst, and hydrogen was passed through the reactor at a temperature of 400° C. in a flow of 1000 ml/minute to contact said solid for 0.5 hour, then the reactor was cooled to room temperature, the reduced solid was discharged to obtain catalyst C4 according to the present invention. The composition of catalyst C4 and the type, distribution, average valence state and ratio of the average valence state to the maximum valence state of metal component are shown in Table 1.

COMPARATIVE EXAMPLE 1

The Comparative Example is provided to illustrate a reference catalyst containing no metal component and a method for preparing the same.

The catalyst was prepared by the same method as that in Example 1, except that no aqueous cobalt nitrate solution was added and the procedure of contacting the solid with hydrogen was not carried out in the fixed-bed reactor, and kaolin, pseudo-boehmite and MOY-zeolite were used in amounts such that the ratio between kaolin (on the weight of dry basis), pseudo-boehmite (on the weight of dry basis) and MOY-zeolite (on the weight of dry basis) was 35.0:35.0:30.0. Reference catalyst CB1 obtained has the same contents of both the molecular sieve and kaolin and no metal component. The composition of CB1 is shown in Table 1.

COMPARATIVE EXAMPLE 2

The Comparative Example is provided to illustrate a reference catalyst containing the metal component in a maximum oxidation state and a method for preparing the same.

Reference catalyst CB2 was obtained by using the same method as that in Example 1 for preparing catalyst, except that the procedure of contacting solid with hydrogen was not carried out in the fixed-bed reactor. The composition of CB2 is shown in Table 1.

COMPARATIVE EXAMPLE 3

The Comparative Example is provided to illustrate a reference catalyst containing the metal component in a maximum oxidation state and a method for preparing the same.

Reference catalyst CB3 was obtained by using the same method as that in Example 3 for preparing catalyst, except that the procedure of contacting the solid with hydrogen was not carried out in the fixed-bed reactor. The composition of CB3 is shown in Table 1.

TABLE 1

| | Example No. | | | | | | |
|---|---|---|---|---|---|---|---|
| | 1 | 2 | 3 | 4 | Comp. Ex. 1 | Comp. Exp. 2 | Comp. Exp. 3 |
| | Catalyst No. | | | | | | |
| | C1 | C2 | C3 | C4 | CB1 | CB2 | CB3 |
| Type of molecular sieve | MOY | MOY | MOY | MOY | MOY | MOY | MOY |
| Molecular sieve content, wt % | 30.0 | 30.0 | 30.0 | 30.0 | 30.0 | 30.0 | 30.0 |
| Type of refractory inorganic oxide | $Al_2O_3$ | $Al_2O_3$ | $Al_2O_3$ | $Al_2O_3$ | $Al_2O_3$ | $Al_2O_3$ | $Al_2O_3$ |
| Content of refractory inorganic oxide, wt % | 34.0 | 34.0 | 34.0 | 34.0 | 35.0 | 34.0 | 34.0 |
| Type of clay | Kaolin | Kaolin | Kaolin | Kaolin | Kaolin | Kaolin | Kaolin |
| Clay content, wt % | 35.0 | 35.0 | 35.0 | 35.0 | 35.0 | 35.0 | 35.0 |
| Type of metal component | Co | Co | Co | Co | — | Co | Co |
| Content of metal component, wt % | 1.0 | 1.0 | 1.0 | 1.0 | — | 1.0 | 1.0 |
| Average valence state of metal component | +1.5 | 0 | +1.5 | +1.5 | — | +3 | +3 |
| Ratio of an average valence state to the maximum valence state of metal component | 0.5 | 0 | 0.5 | 0.5 | — | 1 | 1 |
| Distribution of metal component | Homogeneous distribution in the catalyst | Homogeneous distribution in the catalyst | Homogeneous distribution in the clay | Homogeneous distribution in the molecular sieve | — | Homogeneous distribution in the catalyst | Homogeneous distribution in the clay |

EXAMPLE 5

The example is provided to illustrate the catalyst according to the present invention and a method for preparing the same.

(1) A kaolin containing 3.1% by weight of ZnO was obtained by impregnating 3.0 kg (on the weight of dry basis) kaolin with 3.19 kg of a 7.0 wt % aqueous zinc nitrate solution, and the impregnated kaolin being dried in an oven at 120° C. and calcined at 600° C. for 1 hour.

(2) 500 g NaY (a $Na_2O$ content of 11% by weight, a silica-alumina ratio of 5.6, produced by Changlin Catalyst Factory) was exchanged with 10 liters of a 0.15 mol/liter aqueous ammonium chloride solution at 60° C. for 1 hour, then filtered and the filter cake obtained was calcined at 550° C. for 2 hours. By repeating the above-mentioned steps of exchanging and calcining twice, HY-zeolite having 0.3 wt % of sodium oxide content was obtained.

(3) Catalyst C5 according to the present invention was obtained by using the same method as that in Example 1 for preparing catalyst, except that said ZnO-containing kaolin prepared in step (1) was used to replace said kaolin in Example 1; no aqueous cobalt nitrate solution was added; HY-zeolite prepared in (2) was used to replace MOY; said ZnO-containing kaolin, pseudo-boehmite, HY-zeolite were used in amounts such that the weight ratio between kaolin (on the weight of dry basis), $Al_2O_3$, HY-zeolite (on the weight of dry basis) and ZnO was 25.0:19.2:55.0:0.8; the reductive atmosphere was a mixed gas of hydrogen and carbon monoxide, which contained 50% by volume of hydrogen and 50% by volume of carbon monoxide, the flow of the mixed gas was 2000 ml/minute, the contact temperature of said solid with the mixed gas was 800° C., the contact time was 3 hours. The composition of Catalyst C5 and the type, distribution, average valence state and ratio of the average valence state to the maximum valence state of metal component are shown in Table 2.

EXAMPLE 6

This example is provided to illustrate the catalyst according to the present invention and a method for preparing the same.

A kaolin containing 3.1 wt % of $Fe_2O_3$ was obtained by impregnating 3.0 kg (on the weight of dry basis) kaolin with 2.90 kg of a 10 wt % aqueous ferric nitrate solution, then the impregnated kaolin was dried in an oven at 120° C., and then calcined at 600° C. for 2 hour.

Catalyst C6 according to the present invention was obtained by using the same method as that in Example 1 for preparing catalyst, except that aforesaid $Fe_2O_3$-containing kaolin prepared in step (1) was used to replace said kaolin in Example 1; no aqueous cobalt nitrate solution was added; HY-zeolite prepared by (2) in Example 5 was used to replace MOY; said $Fe_2O_3$-containing kaolin, pseudo-boehmite, HY-zeolitic were used in amounts such that the weight ratio between kaolin (on the weight of dry basis), $Al_2O_3$, HY-zeolite (on the weight of dry basis) and $Fe_2O_3$ was 25.0:19.2: 55.0:0.8; the reductive atmosphere was a mixed gas of hydrogen and carbon monoxide, which contained 50% by volume of hydrogen and 50% by volume of carbon monoxide, the flow of the mixed gas was 1200 ml/minute, the contact temperature of said solid with the mixed gas was 800° C., the contact time was 0.5 hours. The composition of Catalyst C6 and the type, distribution, average valence state and ratio of the average valence state to the maximum valence state of metal component are shown in Table 2.

EXAMPLE 7

The example is provided to illustrate the catalyst according to the present invention and a method for preparing of the same.

A kaolin containing 8.68 wt % of CuO was obtained by impregnating a mixture of 2.925 kg(the weight of dry basis) kaolin and 0.075 kg $TiO_2$ with 3.36 kg of a 20.0 wt % aqueous copper nitrate solution, then the impregnated solid was dried in an oven at 120° C., then calcined at 600° C. for 2 hour.

Catalyst C7 according to the present invention was obtained by using the same method as that in Example 1 for preparing catalyst, except that the aforementioned CuO-containing kaolin was used to replace said kaolin in Example 1; no aqueous cobalt nitrate solution was added; ultra-stable Y-zeolite (commercial trademark DASY, having a unit cell size of 24.45 Å, a Na2O content of 1.0 wt %, produced by Chilu Catalyst Factory) was used to replace MOY; CuO-containing kaolin, pseudo-boehmite, DASY-zeolite were used in amounts such that the weight ratio of kaolin (on the weight of dry basis), $TiO_2$, $Al_2O_3$, DASY-zeolite (on the weight of dry basis) and CuO was 39.0:1.0:26.2:30:3.8; the reductive atmosphere was a mixed gas of hydrogen and carbon monoxide, which contained 50% by volume of hydrogen and 50% by volume of carbon monoxide, the flow of the mixed gas was 1000 ml/minute, the contact temperature of said solid and the mixed gas was 400° C., the contact time was 0.5 hours. The composition of Catalyst C7 and the type, distribution, average valence state and ratio of the average valence state to the maximum valence state of metal component are shown in Table 2.

EXAMPLE 8

The example is provided to illustrate the catalyst according to the present invention and a method for preparing the same.

A kaolin containing 2.63 wt % of $MnO_2$ was obtained by impregnating 3.0 kg (on the weight of dry basis) kaolin with 3.34 kg of a 5.0 wt % aqueous manganese nitrate solution, then the impregnated solid was dried in an oven at 120° C., then calcined at 550° C. for 2 hour.

Catalyst C8 according to the present invention was obtained by using the same method as that in Example 1 for preparing catalyst, except that $MnO_2$-containing kaolin mentioned above was used to replace said kaolin in Example 1; no aqueous cobalt nitrate solution was added; DASY-zeolite and phosphorus- and rare-earth-containing zeolite having MFI structure (commercial trademark ZRP-1, having a phosphorus content of 2.0 wt % based on element phosphorus, a rare-earth oxide content of 1.0 wt %, wherein the lanthanum oxide content was 0.53 wt %, ceria content was 0.13 wt %, the other rare-earth oxides content was 0.34 wt %, the $Na_2O$ content was less than 0.1 wt %, and a molar ratio of $SiO_2$ to $Al_2O_3$ was 60, produced by Chilu Catalyst Factory) were used to replace MOY; $MnO_2$-containing kaolin, pseudo-boehmite, DASY-zeolitic and ZRP-1 zeolite were used in amounts such that the weight ratio of kaolin (on the weight of dry basis), $Al_2O_3$ and DASY-zeolite (on the weight of dry basis), ZRP-1 zeolite (on the weight of dry basis) and $MnO_2$ was to 37.0: 27.0:30.0:5.0:1.0; the reductive atmosphere was a mixed gas of hydrogen and propane, which contained 80 vol % of hydrogen and 20 vol % of propane, the flow of the mixed gas was 1500 ml/minute, the contact temperature of said solid with the mixed gas was 500° C. and the contact time was 1 hour. The composition of Catalyst C8 and the type, distribution, average valence state and ratio of the average valence state to the maximum valence state of metal component are shown in Table 2.

TABLE 2

| | Example No. | | | |
|---|---|---|---|---|
| | 5 | 6 | 7 | 8 |
| | Catalyst No. | | | |
| | C5 | C6 | C7 | C8 |
| Type of molecular sieve | HY | HY | DASY | DASY + ZRP |
| Content of molecular sieve, wt % | 55.0 | 55.0 | 30.0 | 35.0 |
| Type of refractory inorganic oxide | $Al_2O_3$ | $Al_2O_3$ | $Al_2O_3$ + $TiO_2$ | $Al_2O_3$ |
| Content of refractory inorganic oxide, wt % | 19.2 | 19.2 | 27.2 | 27.0 |
| Type of clay | kaolin | kaolin | kaolin | kaolin |
| Content of clay, wt % | 25.0 | 25.0 | 39.0 | 37.0 |
| Type of metal component | Zn | Fe | Cu | Mn |
| Content of metal component, wt % | 0.8 | 0.8 | 3.8 | 1.0 |
| Average valence state of metal component | +1.4 | +2.0 | +0.6 | +1.5 |
| Ratio value of the average valence state to the maximum valence state of metal component | 0.70 | 0.67 | 0.3 | 0.38 |
| Distribution of metal component | Homogeneous distribution in the clay | Homogeneous distribution in the clay | Dispersed in the clay and refractory inorganic oxide | Homogeneous distribution in the clay |

EXAMPLE 9

This example is provided to illustrate the catalyst according to the present invention and a method for preparing the same.

A mixture of 3.0 kg (on the weight of dry basis) kaolin and 0.5 kg (on the weight of dry basis) kieselguhr (a solid content of 85.0 wt %, produced by Huali Kieselguhr Factory Chenzhou, Zhejiang Province) was impregnated with 3.22 kg of a 5.0 wt % aqueous ammonium molybdate (($NH_4$)$_6$$Mo_7$$O_{24}$·$4H_2O$) solution, then impregnated solid was dried in an oven at 120° C., then the dried solid was impregnated with 2.41 kg of a 2.0 wt % aqueous silver nitrate solution, and then the impregnated solid was dried in an oven at 120° C., and calcined at 600° C. for 2 hours, a mixture of kaolin and kieselguhr containing 3.58 wt % of $MoO_3$ and 0.90 wt % of $Ag_2O$ was obtained.

Catalyst C9 according to the present invention was obtained by using the same method as that in Example 1 for preparing catalyst, except that $MoO_3$-and $Ag_2O$-containing mixture of kaolin and kieselguhr mentioned above was used to replace said kaolin in example 1; no aqueous cobalt nitrate solution was added, the $MoO_3$-and $Ag_2O$- containing mixture of kaolin and kieselguhr, pseudo-boehmite, MOY-zeolite were used in amounts such that the weight ratio between the mixture of kaolin and kieselguhr (on the weight of dry basis), $Al_2O_3$, MOY-zeolite (on the weight of dry basis), $MoO_3$ and $Ag_2O$ was 32.0:21.5:45.0:1.2:0.3; the reductive atmosphere was a mixed gas of nitrogen and hydrogen, which contained 50 vol % of hydrogen, the flow of the mixed gas was 2500 ml/minute, the contact temperature of said solid with the mixed gas was 650° C., the contact time was 1 hour. The composition of Catalyst C9 and the type, distribution, average valence state and ratio of the average valence state to the maximum valence state of metal component are shown in Table 3.

EXAMPLE 10

This example is provided to illustrate the catalyst according to the present invention and a method for preparing the same.

A mixture of 3.0 kg (on the weight of dry basis) kaolin and 0.08 kg magnesium oxide was impregnated under stirring with 2.97 kg of a 2.0 wt % aqueous ammonium metavanadate ($NH_4VO_3$) solution, then the resultant slurry was dried in an oven at 120° C. and the resultant slurry was calcined at 550° C. for 2 hours, the kaolin containing 2.46 wt % of MgO and 1.48 wt % of $V_2O_5$ was obtained.

Catalyst C10 according to the present invention was obtained by using the same method as that in Example 1 for preparing catalyst, except that the MgO and $V_2O_5$-containing kaolin mentioned above was used to replace said kaolin in Example 1; no aqueous cobalt nitrate solution was added; DASY-zeolite (the same specification as that in Example 7) was used to replace MOY-zeolite; MgO- and $V_2O_5$-containing kaolin, pseudo-boehmite, DASY-zeolite were used in amounts such that the weight ratio between kaolin (on the weight of dry basis), magnesium oxide, $Al_2O_3$, DASY-zeolite (on the weight of dry basis) and $V_2O_5$ was 39.0:1.0:24.4:35.0:0.6; the contact temperature of said solid with hydrogen was 550° C., the flow of hydrogen was 1000 ml/minute, the contact time was 1 hour. The composition of Catalyst C10 and the type, distribution, average valence state and ratio of the average valence state to the maximum valence state of metal component are shown in Table 3.

EXAMPLE 11

The example is provided to illustrate the catalyst according to the present invention and a method for preparing the same.

A mixture of 3.0 kg (on the weight of dry basis) kaolin and 0.86 kg (on the weight of dry basis) pseudo-boehmite was impregnated with 2.74 kg of a 40 wt % aqueous gallium chloride solution, then the impregnated solid was dried in an oven at 120° C., then calcined at 600° C. for 2 hour to obtain a mixture of kaolin and alumina, containing 13.1 wt % of $Ga_2O_3$.

The $Ga_2O_3$-containing mixture of kaolin and alumina, silica-sol and deionized water were mixed homogeneously, DASY zeolite and ZRP-1 zeolite were added to the resultant mixture, then mixed homogeneously. Deionized water was used in an amount so as to obtain a slurry having a solid content of 25% by weight. The $Ga_2O_3$-containing mixture of kaolin and alumina, silica-sol, ultra-stable Y-zeolite and the zeolite having MFI structure were used in amounts such that the weight ratio between kaolin (on the weight of dry basis), alumina, silica, DASY-zeolite (on the weight of dry basis), ZRP-1 zeolite (on the weight of dry basis) and $Ga_2O_3$ was 35.0:10;13.2;30:5:6.8.

The obtained slurry was dried by spraying at a temperature of 150° C., then the resultant solid was calcined at 550° C. for 2 hours, and then aged with 100% steam at 800° C. for 8 hours. 200 g of the obtained solid was filled in a fixed bed reduction reactor, hydrogen was passed through the reactor at a temperature of 600° C. in a flow of 3000 ml/minute to allow said solid contact with hydrogen for 2 hours, then the reactor was cooled to room temperature, the reduced solid was discharged to obtain Catalyst C11 according to the present invention. The composition of Catalyst C11 and the type, distribution, average valence state and ratio of the average valence state to the maximum valence state of the metal component are shown in Table 3.

EXAMPLE 12

This example is provided to illustrate the catalyst according to the present invention and a method for preparing the same.

A mixture of kaolin and silica, which contained 4.0 wt % of $SnO_2$, was obtained by mixing homogeneously 3.15 kg of a 6.0 wt % aqueous stannous chloride ($SnCl_2$) solution, 0.6 kg (on the weight of dry basis) of silica-sol and 3.0 kg (on the weight of dry basis) of kaolin, and drying in an oven the obtained slurry at 120° C., then calcining the resultant solid at 550° C. for 3 hours.

The $SnO_2$-containing mixture of kaolin and silica, alumina-sol and deionized water were mixed homogeneously, DASY-zeolite and ZRP-1 zeolite were added to the resultant mixture, and then mixed homogeneously. Deionized water was used in such an amount that the slurry was obtained having a solid content of 25% by weight. The $SnO_2$-containing mixture of kaolin and silica, alumina-sol, DASY and ZRP-1 zeolite were used in amounts such that the weight ratio between kaolin (on the weight of dry basis), alumina, silica, DASY-zeolite (on the weight of dry basis), ZRP-1 zeolite (on the weight of dry basis) and $SnO_2$ was 40.0:20.0:8.0:25:5:2.0. The obtained slurry was dried by spraying at a temperature of 150° C., then the resultant solid was calcined at 550° C. for 2 hours, then aged with 100% steam at 800° C. for 8 hours.

200 g of the obtained solid was filed in a fixed bed reduction reactor, hydrogen was passed through the reactor at a temperature of 650° C. in a flow of 1000 ml/minute to allow said solid contact with hydrogen for 1 hour, then the reactor was cooled to room temperature, then the reduced solid was taken down to obtain Catalyst C12 according to the present invention. The composition of Catalyst C12 and the type, distribution, average valence state and ratio of the average valence state to the maximum valence state of metal component are shown in Table 3.

TABLE 3

| | Example No. | | | |
|---|---|---|---|---|
| | 9 | 10 | 11 | 12 |
| | | Catalyst No. | | |
| | C9 | C10 | C11 | C12 |
| Type of molecular sieve | MOY | DASY | DASY + ZRP-1 | DASY + ZRP-1 |
| Content of molecular sieve, wt % | 45.0 | 35.0 | 35.0 | 30.0 |
| Type of refractory inorganic oxide | $Al_2O_3$ | $Al_2O_3$ + MgO | $Al_2O_3$ – $SiO_2$ | $Al_2O_3$ + $SiO_2$ |
| Content of refractory inorganic oxide, wt % | 21.5 | 25.4 | 23.2 | 28.0 |
| Type of clay | Kaolin + kieselguhr | Kaolin | Kaolin | Kaolin |
| Clay content, wt % | 32.0 | 39.0 | 35.0 | 40.0 |
| Type of metal component | Mo, Ag | V | Ga | Sn |
| Content of metal component, wt % | Mo 1.2 Ag 0.3 | 0.6 | 6.8 | 2.0 |
| Average valence state of metal component | Mo +3.0 Ag 0 | +2.3 | +1.5 | +2.2 |
| Ratio value of the average valence state to the maximum valence state of metal component | Mo 0.5 Ag 0 | 0.46 | 0.5 | 0.55 |
| Distribution of metal component | Homogeneous distribution in the clay | Homogeneous distribution in clay and magnesium oxide | Dispersed in clay and alumina | Dispersed in clay and silica |

EXAMPLES FROM 13 to 24

Following examples are provided to illustrate the catalytic performances of the catalysts according to the present invention.

In a small scale of fixed bed reaction apparatus filled with 4.0 g of catalyst, the catalytically cracking of the sulfur-containing vacuum gas oil with a distillation range of 329-550° C. as shown in Table 4 was carried out by using the catalysts from C1-C12 respectively. The reaction conditions and reaction results are shown in Tables from 5-7 respectively. The sulfur content of cracked products was measured by gas chromatography-atomic emission spectrometry, using HP 6890GC-G2350A AED gas chromatography-atomic emission spectroscopy meter.

Wherein, catalyst-oil ratio refers to a weight-ratio of a catalyst to said feedstock oil.

COMPARATIVE EXAMPLES 4 to 6

Following Comparative Examples are provided to illustrated catalytic performances of reference catalysts.

The catalytically cracking of the same feedstock oil was carried out by the method according to Example 13, except that Reference Catalyst CB1, CB2 and CB3 were used respectively, the reaction conditions and reaction results are shown in Table 5.

TABLE 4

| Name of feedstock oil | Atmospheric residue | Vacuum gas oil |
|---|---|---|
| Density (20° C.), g/cm³ | 0.8906 | 0.9154 |
| Viscosity, mm²/sec | | |
| 50° C. | — | 34.14 |
| 100° C. | 24.84 | 6.96 |
| Asphaltenes, wt % | 0.8 | 0.0 |
| Conradson carbon residue content, wt % | 4.3 | 0.18 |
| S. wt % | 0.13 | 2.0 |
| Distillation range, ° C. | | |
| IBP | 282 | 329 |
| 10% | 370 | 378 |
| 50% | 553 | 436 |
| 90% | — | 501 |
| 95% | — | 518 |
| FBP | — | 550 |

Results in Table 5 show that, as compared with the catalyst having the same zeolite content but no metal component and the catalyst having the same content of each component but said metal component only in maximum oxidation state, the cracking activities of the catalysts according to the present invention are increased greatly, and the sulfur reduction activities are also increased greatly.

TABLE 6

| | Example No. | | | |
|---|---|---|---|---|
| | 17 | 18 | 19 | 20 |
| | Catalyst No. | | | |
| | C5 | C6 | C7 | C8 |
| Reaction temperature, ° C. | 480 | 480 | 480 | 480 |
| WHSV, hour⁻¹ | 16 | 16 | 16 | 16 |
| Catalyst-oil ratio | 5 | 5 | 5 | 5 |
| Conversion, wt % | 83.2 | 82.1 | 75.1 | 80.6 |
| Yield of product, wt % | | | | |
| Dry gas | 2.3 | 22 | 2 | 2.1 |
| LPG | 13.2 | 14.8 | 10.5 | 17.4 |
| Gasoline | 58.6 | 56.2 | 54 | 51.8 |
| Diesel oil | 6.3 | 8.1 | 11.9 | 13.3 |
| Heavy oil | 10.5 | 9.8 | 13 | 6.1 |
| Coke | 9.1 | 8.9 | 8.6 | 9.3 |
| Sulfur content of gasoline, mg/l | 530.5 | 562 | 421.3 | 454.2 |

TABLE 7

| | Example No. | | | |
|---|---|---|---|---|
| | 21 | 22 | 23 | 24 |
| | Catalyst No. | | | |
| | C9 | C10 | C11 | C12 |
| Reaction temperature, ° C. | 520 | 520 | 520 | 520 |
| WHSV, hour⁻¹ | 16 | 16 | 16 | 16 |
| Catalyst-oil ratio | 3.5 | 3.5 | 3.5 | 3.5 |
| Conversion, wt % | 83.2 | 75.6 | 74.5 | 67.9 |
| Yield of product, wt % | — | — | — | — |
| Dry gas | 2.5 | 2.3 | 1.9 | 2.2 |
| LPG | 14.8 | 13.5 | 15 | 13.6 |

TABLE 5

| | Example No. | | | | | | |
|---|---|---|---|---|---|---|---|
| | 13 | 14 | 15 | 16 | Comp. Exp. 4 | Comp. Exp. 5 | Comp. Exp. 6 |
| | Catalyst No. | | | | | | |
| | C1 | C2 | C3 | C4 | CB1 | CB2 | CB3 |
| Reaction temperature, ° C. | 500 | 500 | 500 | 500 | 500 | 500 | 500 |
| WHSV, hour⁻¹ | 16 | 16 | 16 | 16 | 16 | 16 | 16 |
| Catalyst-oil ratio | 4 | 4 | 4 | 4 | 4 | 4 | 4 |
| Conversion, wt % | 78.6 | 76.8 | 78 | 76.4 | 68.9 | 75.1 | 74 |
| Yield of product, wt % | | | | | | | |
| Dry gas | 2 | 2.5 | 1.9 | 2.4 | 2.2 | 1.8 | 1.9 |
| LPG | 15.9 | 15.0 | 15.8 | 14.9 | 12.6 | 15.9 | 14.8 |
| Gasoline | 52 | 50.3 | 51.8 | 50.2 | 45.2 | 47.9 | 47.5 |
| Diesel oil | 14.3 | 15.3 | 15.2 | 15.0 | 14.8 | 13.8 | 14.2 |
| Heavy oil | 7.1 | 7.9 | 6.8 | 8.6 | 16.3 | 11.1 | 11.8 |
| Coke | 8.7 | 9 | 8.5 | 8.9 | 8.9 | 9.5 | 9.8 |
| Sulfur content of gasoline, mg/l | 416.7 | 475.6 | 403.5 | 482.2 | 758.3 | 670.6 | 681.2 |

TABLE 7-continued

| | Example No. | | | |
|---|---|---|---|---|
| | 21 | 22 | 23 | 24 |
| | Catalyst No. | | | |
| | C9 | C10 | C11 | C12 |
| Gasoline | 56.6 | 50.2 | 48.2 | 43.5 |
| Diesel | 9.3 | 11.2 | 13.2 | 13.2 |
| Heavy oil | 7.5 | 13.2 | 12.3 | 18.9 |
| Coke | 9.3 | 9.6 | 9.4 | 8.6 |
| Sulfur content of gasoline, mg/l | 415.2 | 423.6 | 520.1 | 489.3 |

EXAMPLES 25 to 26

Following examples are provided to illustrate the catalytic performances of the catalysts according to the present invention.

A commercial cracking catalyst (produced by Chilu Catalyst Factory) with commercial trademark MLC500 was aged at 800° C. with 100% steam for 8 hours, then mixed with the Catalyst C1 and Catalyst C8 respectively to obtain a mixed catalyst containing 20 wt % of C1 and 80 wt % of MLC500 and a mixed catalyst containing 5 wt % of C8 and 95 wt % of MLC500. In a small scale of the fixed bed reaction apparatus, the catalytically cracking of the mixed oil which contained 20 wt % of atmospheric residuum and 80 wt % of vacuum gas oil as shown in Table 4 was carried out by using the two mixed catalysts respectively. The reaction conditions and reaction results are shown in Table 8.

COMPARATIVE EXAMPLE 7

Following examples are provided to illustrate the case where commercial catalyst MLC500 was used alone.

The catalytically cracking of the same feedstock oil was carried out by the same method as that in Examples 25 and 26, except that the catalyst used was a MLC500 which had been aged under the same condition. Reaction results are shown in Table 8.

TABLE 8

| | Example No. | | |
|---|---|---|---|
| | 25 | 26 | Comp. Exp. 7 |
| | Catalyst | | |
| | 20% C1 + 80% MLC500 | 5% C8 + 95% MLC500 | MLC500 |
| Reaction temperature, ° C. | 500 | 500 | 500 |
| WHSV, hour$^{-1}$ | 20 | 20 | 20 |
| Catalyst-oil ratio | 6.0 | 6.0 | 6.0 |
| Conversion, wt % | 75.3 | 72.1 | 70.3 |
| Yield of product, wt % | | | |
| Dry as | 1.8 | 1.7 | 1.6 |
| LPG | 21.1 | 18.7 | 18.9 |
| Gasoline | 45.4 | 44.9 | 43.5 |
| Diesel oil | 17.5 | 19.9 | 20.8 |
| Heavy oil | 7.2 | 8.0 | 8.9 |
| Coke | 7.0 | 6.8 | 6.3 |
| Sulfur content of gasoline, mg/l | 626.5 | 725.4 | 856.3 |

The results in Table 8 show that when the catalyst according to the present invention is used as a additive for the catalytically cracking catalyst, the result of substantially reducing sulfur of gasolines can be obtained similarly. The product distribution is also improved and conversion is increased significantly.

The present application claims priority under 35 U.S.C. §119 of Chinese Patent Application No. 03137906.0 filed on May 30, 2003. The disclosure of the foregoing application is expressly incorporated by reference herein in its entirety.

The invention claimed is:

1. A molecular sieve-containing catalyst for cracking hydrocarbons, comprising molecular sieve, refractory inorganic oxide, clay and a metal component, wherein the amount of said molecular sieve is from 1 to 90% by weight, the refractory inorganic oxide is from 2 to 80% by weight, the clay is from 2 to 80% by weight, and the metal component is from 0.1 to 30% by weight, calculated as the oxide of said metal having its maximum valence state, based on the total amount of the catalyst, wherein said metal component exists essentially in a reduction state and is one or more metals selected from the group consisting of metals of Group IIIA (other than aluminum), metals of Group IVA, VA, IB, IIB, VB, VIB and VIIB, and non-noble metals of Group VIII of the periodic table, and said molecular sieve is one or more selected from the group consisting of Y-zeolite, phosphorus- and/or rare-earth-containing Y-zeolite, ultra-stable Y-zeolite, phosphorus and/or rare-earth-containing ultra-stable Y-zeolite, beta zeolite, zeolites having MFI structure, and phosphorus-and/or rare-earth-containing zeolites having MFI structures and wherein said metal component has a ratio of its average valence state to the maximum valence state of from 0.1 to 0.7 and exists in refractory inorganic oxide and/or clay.

2. The catalyst according to claim 1, wherein the amount of said molecular sieve is from 10 to 60% by weight, the refractory inorganic oxide is from 10 to 50% by weight, the clay is from 20 to 70% by weight, and said metal component is from 0.50 to 20% by weight, calculated as the oxide of said metal having its maximum valence state.

3. The catalyst according to claim 1 or 2, wherein said metal component is one or more metals selected from the group consisting of gallium, germanium, tin, antimony, bismuth, lead, copper, silver, zinc, cadmium, vanadium, molybdenum, tungsten, manganese, iron, cobalt and/or nickel.

4. The catalyst according to claim 1 or 2, wherein said metal component is one or more metals selected from the group consisting of gallium, tin, copper, silver, zinc, vanadium, molybdenum, manganese, iron, and/or cobalt.

5. The catalyst according to claim 1, wherein said refractory inorganic oxide is one or more selected from the group consisting of alumina, silica, amorphous silica-alumina, zirconia, titanium oxide, boron oxide, and oxides of alkaline earth metals.

6. The catalyst according to claim 5, wherein said refractory inorganic oxide is one or more selected from the group consisting of alumina, silica, amorphous silica-alumina, zirconia, titanium oxide, magnesium oxide, and calcium oxide.

7. The catalyst according to claim 1, wherein said clay is one or more selected from the group consisting of kaolin, halloysite, montmorillonite, kieselguhr, endellite, soapstone, reactorite, sepiolite, attapulgus, hydrotalcite, and bentonite.

8. The catalyst according to claim 1 or 2, wherein the catalyst further comprises a rare-earth metal component, wherein the amount of said rare-earth metal component is from 0 to 50% by weight, calculated as the oxide, based on the total amount of the catalyst.

9. The catalyst according to claim 8, wherein the amount of said rare-earth metal component is from 0 to 15% by weight.

10. The catalyst according to claim 8, wherein said rare-earth metal is selected from the group consisting of lanthanum, cerium, rich-lanthanum norium or rich-cerium norium.

11. The catalyst according to claim 1 or 2, wherein the catalyst further comprises a phosphorus component, wherein the amount of said phosphorus component is from 0 to 15% by weight calculated as elemental phosphorus, based on the total amount of the catalyst.

12. The catalyst according to claim 11, wherein the amount of said phosphorus component is from 0 to 8% by weight calculated as elemental phosphorus, based on the total amount of the catalyst.

13. A method for preparing the catalyst according to claim 1, wherein said method comprises contacting the composition containing metal component compound, molecular sieve, refractory inorganic oxide and clay with a reducing gas-containing atmosphere at suitable temperature for enough time so that said metal component has an average valence state lower than its maximum oxidation state, and said metal component is one or more metals selected from the group consisting of metals of Group IIIA (other than aluminum), metals of Groups IVA, VA, IB, IIB, VB, VIB and VIIB, and non-noble metals of Group VIII of the periodic table, wherein the amount of each component is such that the final catalyst comprises, based on the total amount of the catalyst, from 1 to 90% by weight of the molecular sieve, from 2 to 80% by weight of the refractory inorganic oxide, from 2 to 80% by weight of the clay, and from 0.1 to 30% by weight of the metal component, calculated as the oxide of said metal having its maximum valence state.

14. The method according to claim 13, wherein said reducing gas-containing atmosphere is an atmosphere of pure reducing gas or an atmosphere containing reducing gas and inert gases.

15. The method according to claim 14, wherein said pure reducing gas comprises one or more selected from the group consisting of hydrogen, carbon monoxide and hydrocarbons having 1-5 carbon atoms.

16. The method according to claim 15, wherein said pure reducing gas comprises one or more selected from the group consisting of hydrogen, carbon monoxide, methane, ethane, propane, butane and its isomers, pentane and its isomers.

17. The method according to claim 14, wherein said atmosphere containing reducing gas and inert gases comprises a mixture of one or more gases selected from hydrogen, carbon monoxide and hydrocarbons containing 1-5 carbon atoms and inert gases, or refinery dry gas.

18. The method according to claim 14 or 17, wherein said reducing gas-containing atmosphere has at least 10% by volume of the reducing gas.

19. The method according to claim 13, wherein said contact temperature is from 100 to 900° C. and said contact time is from 0.1 seconds to 10 hours.

20. The method according to claim 13, wherein said reducing gas-containing atmosphere is used in an amount no less than 5 ml of the reducing gas per gram of catalyst per hour.

21. The method according to claim 13, wherein the amount of each component is such that the final catalyst comprises, based on the total amount of the catalyst, from 10 to 60% by weight of the molecular sieve, from 10 to 50% by weight of the refractory inorganic oxide, from 20 to 60% by weight of the clay, from 0.5 to 20% by weight of the metal component, calculated as the oxide of the metal having its maximum valence state.

22. The method according to claim 13, wherein said composition containing the metal component compound, molecular sieve, refractory inorganic oxide and clay further contains rare-earth compound and/or phosphorous compound.

23. A molecular sieve-containing catalyst for cracking hydrocarbons, wherein said catalyst comprises molecular sieve, refractory inorganic oxide, clay and a metal component, wherein the amount of the molecular sieve is from 1 to 90% by weight, the refractory inorganic oxide is from 2 to 80% by weight, the clay is from 2 to 80% by weight, said metal component is from 0.1 to 30% by weight, calculated as the oxide of said metal having its maximum valence state, based on the total amount of the catalyst; wherein said metal component is one or more selected from the group consisting of metals of Group IIIA (other than aluminum), metals of Groups IVA, VA, IB, IIB, VB, VIB and VIIB, and non-noble metals of Group VIII of the periodic table; said catalyst is prepared by the method according to any one of claims 13-17 and 19-22.

* * * * *